US011338739B1

(12) United States Patent
Gwinn

(10) Patent No.: US 11,338,739 B1
(45) Date of Patent: May 24, 2022

(54) FISHING ROD TRUCK RACK

(71) Applicant: Randy Gwinn, Simpsonville, SC (US)

(72) Inventor: Randy Gwinn, Simpsonville, SC (US)

( * ) Notice: Subject to any disclaimer, the term of this patent is extended or adjusted under 35 U.S.C. 154(b) by 31 days.

(21) Appl. No.: 17/088,731

(22) Filed: Nov. 4, 2020

(51) Int. Cl.
| | |
|---|---|
| *B60R 9/06* | (2006.01) |
| *B60R 9/08* | (2006.01) |
| *A01K 97/10* | (2006.01) |
| *B60R 7/08* | (2006.01) |
| *B60R 9/00* | (2006.01) |
| *B60R 11/00* | (2006.01) |

(52) U.S. Cl.
CPC ............... *B60R 9/08* (2013.01); *A01K 97/10* (2013.01); *B60R 7/08* (2013.01); *B60R 9/00* (2013.01); *B60R 11/00* (2013.01); *B60R 2011/0071* (2013.01)

(58) Field of Classification Search
CPC .... B60R 9/00; B60R 9/06; B60R 9/08; B60R 7/08; B60R 9/02; B60R 9/048; Y10S 224/922; A01K 97/10; A01K 97/11; A47B 81/005
USPC ........................................ 224/403, 405, 922
See application file for complete search history.

(56) References Cited

U.S. PATENT DOCUMENTS

| | | | | |
|---|---|---|---|---|
| 1,970,962 | A * | 8/1934 | Hinckley ................... | B60R 9/02 224/570 |
| 2,536,797 | A * | 1/1951 | Cooke ........................ | B60R 9/08 224/568 |
| 2,797,851 | A * | 7/1957 | Leake ...................... | A01K 97/08 224/482 |
| 2,807,398 | A * | 9/1957 | Mathews ................... | B60R 9/08 224/317 |
| 4,739,914 | A * | 4/1988 | Pothetes ................. | A01K 97/10 224/247 |
| 5,647,489 | A * | 7/1997 | Bellis, Jr. .............. | A47B 81/005 211/208 |
| 5,979,102 | A * | 11/1999 | Sagryn .................... | A01K 97/08 114/364 |
| 8,800,788 | B1 * | 8/2014 | Guidry ...................... | B60R 7/08 211/70.8 |
| 8,875,963 | B2 * | 11/2014 | Knutson ................ | A01K 97/08 224/405 |
| 8,905,280 | B2 * | 12/2014 | Martin ...................... | B60R 9/00 224/405 |
| 10,131,289 | B2 * | 11/2018 | Frederick .................. | B60R 9/08 |
| 10,940,787 | B1 * | 3/2021 | Woosley ................. | B60R 11/06 |

* cited by examiner

*Primary Examiner* — Adam J Waggenspack
(74) *Attorney, Agent, or Firm* — Lyman Moulton, Esq.; Moulton Patents PLLC

(57) ABSTRACT

The fishing rod rack gives the user a place to secure several fishing rods in a truck bed. The fishing rods are held by clips positioned on two posts, which are inserted into openings in the truck bed. The secure clips prevent the fishing rods from falling out of the rack, but the clips can also be adjusted and opened so the fishing rods may quickly be removed once needed. Furthermore, there is a rubber string on each post that runs from the top of the post to an eye hook towards the base of said post.

20 Claims, 3 Drawing Sheets

FISHING ROD TRUCK RACK

BACKGROUND

A fishing rod is a long, flexible rod used by fishermen to catch fish. At its simplest, a fishing rod is a simple stick or pole attached to a line ending in a hook. The length of the rod can vary between 2 and 20 feet. To entice fish, bait or lures are impaled on one or more hooks attached to the line. There have been no products available as original equipment or as an aftermarket to address this problem.

Due to their long length, light weight, and somewhat fragile structure, fishing rods can be difficult to transport safely. When they are placed in the bed of a truck, for example, they tend to roll and bounce around, causing them to be damaged. Fishers need a safe an efficient way to transport their fishing rods to and from the destination where they go fishing. There have been no products available as original equipment or as an aftermarket to address this problem either.

There exists a need for a fishing rod truck rack that is not being met by any known or disclosed device or system of present.

SUMMARY OF THE INVENTION

The fishing rod rack gives the user a place to secure several fishing rods in a truck bed. The fishing rods are held by clips positioned on two posts, which are inserted into openings in the truck bed. The secure clips prevent the fishing rods from falling out of the rack, but the clips can also be adjusted and opened so the fishing rods may quickly be removed once needed. Furthermore, there is a rubber string on each post that runs from the top of the post to an eye hook towards the base of said post for extra security from detachment and loss during driving, without appreciable extra work in insertion and removal.

Figure 1:
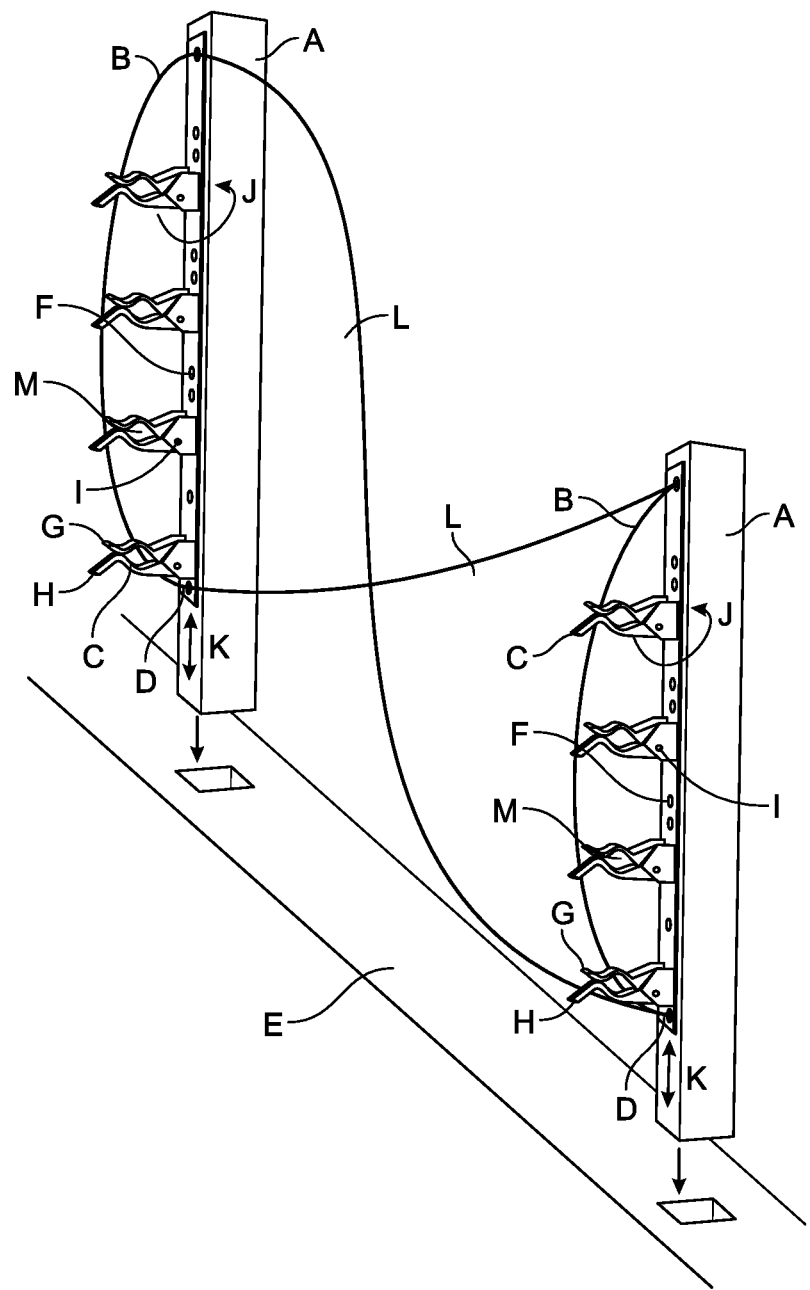
FIG. 1 is a view of the two fishing rod rack supports standing upright as they should be placed in the truck bed in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term [term] is used to refer to [describe, rest of sentence]. The term [term] refers to [describe, rest of sentence].

FIG. 1 is a view of the two fishing rod rack supports standing upright as they should be placed in the truck bed in accordance with an embodiment of the present disclosure. Posts A are inserted into openings in the truck bed E. Each post has several clips C with which to secure one side of the fishing rod. Additionally, a rubber string B runs along the clips from the top of the pole and attaches to the post at the bottom by a small eye hook D. Furthermore, the post runner F moves up and down on the post A illustrated by movement K. Also, the clip top lip G and the bottom lip H of the clip C are urged open by a force of a fishing rod portion orthogonally applied thereto. The swivel base I moves about its pivot on the post runner F as shown by movement J. The interpost rubber string securements allow another way of suring up the mounts and the fishing poles retained in the recesses M of the clips I.

Figure 2:
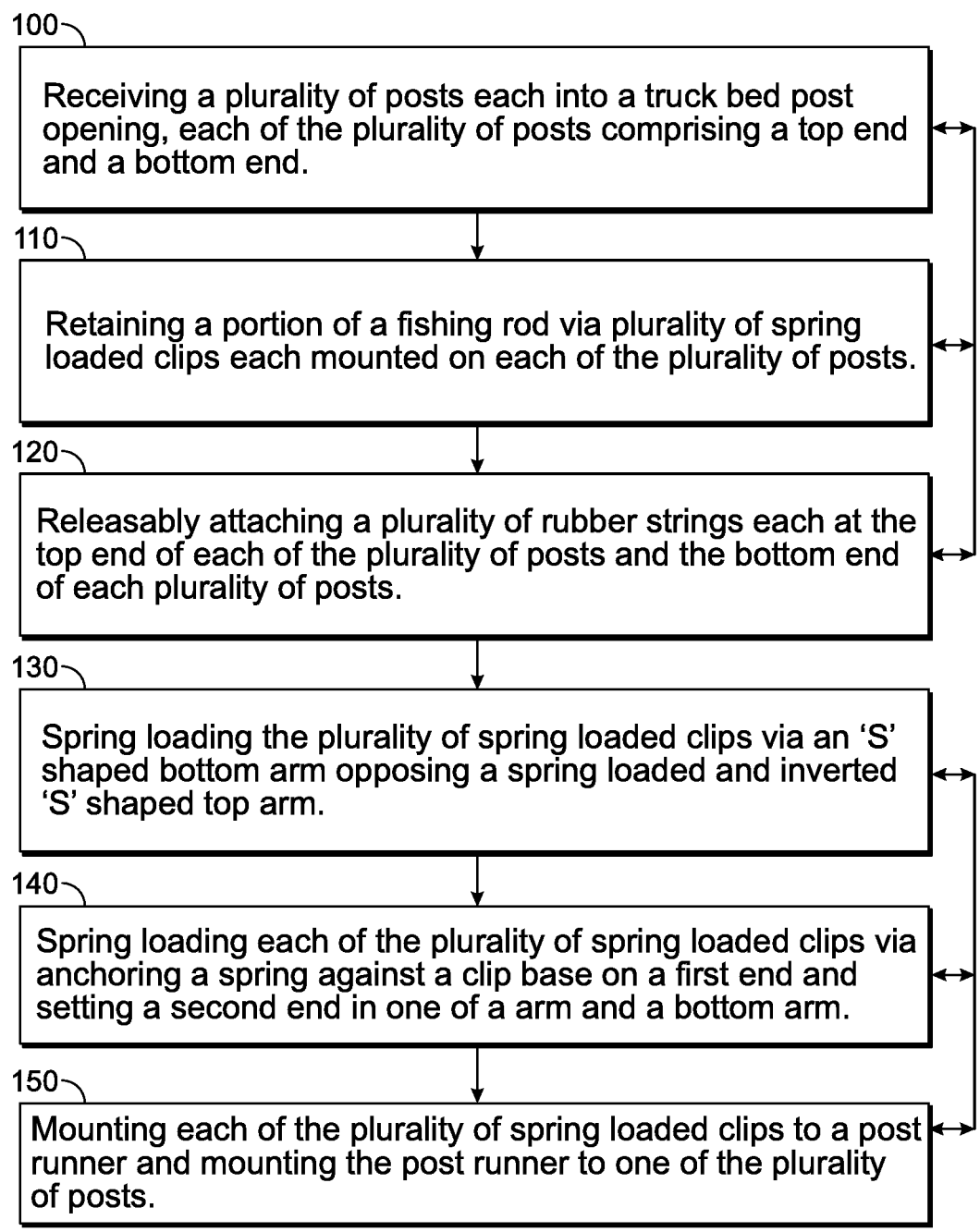
FIG. 2 is a flow chart of a method for mounting fishing rods in the bed of a truck in accordance with an embodiment of the present disclosure.

FIG. 2 is a flow chart of a method for mounting fishing rods in a truck bed in accordance with an embodiment of the present disclosure. The method includes receiving 100 a plurality of posts each into a truck bed post opening, each of the plurality of posts comprising a top end and a bottom end. The method also includes retaining 110 a portion of a fishing rod via a plurality of spring loaded clips each mounted on each of the plurality of posts. The method additionally includes releasably attaching 120 a plurality of rubber strings each at the top end of each of the plurality of posts and at the bottom end of each plurality of posts.

Embodiments of the method comprise spring loading 130 the plurality of spring loaded clips via an 'S' shaped bottom arm opposing a spring loaded and inverted 'S' shaped top arm. Embodiments of the method also comprise spring loading 140 each of the plurality of spring loaded clips via anchoring a spring against a clip base on a first end and setting a second end in one of a top arm and a bottom arm. Embodiments of the method further comprise mounting 150 each of the plurality of spring loaded clips to a post runner and mounting the post runner to one of the plurality of posts.

Figure 3:
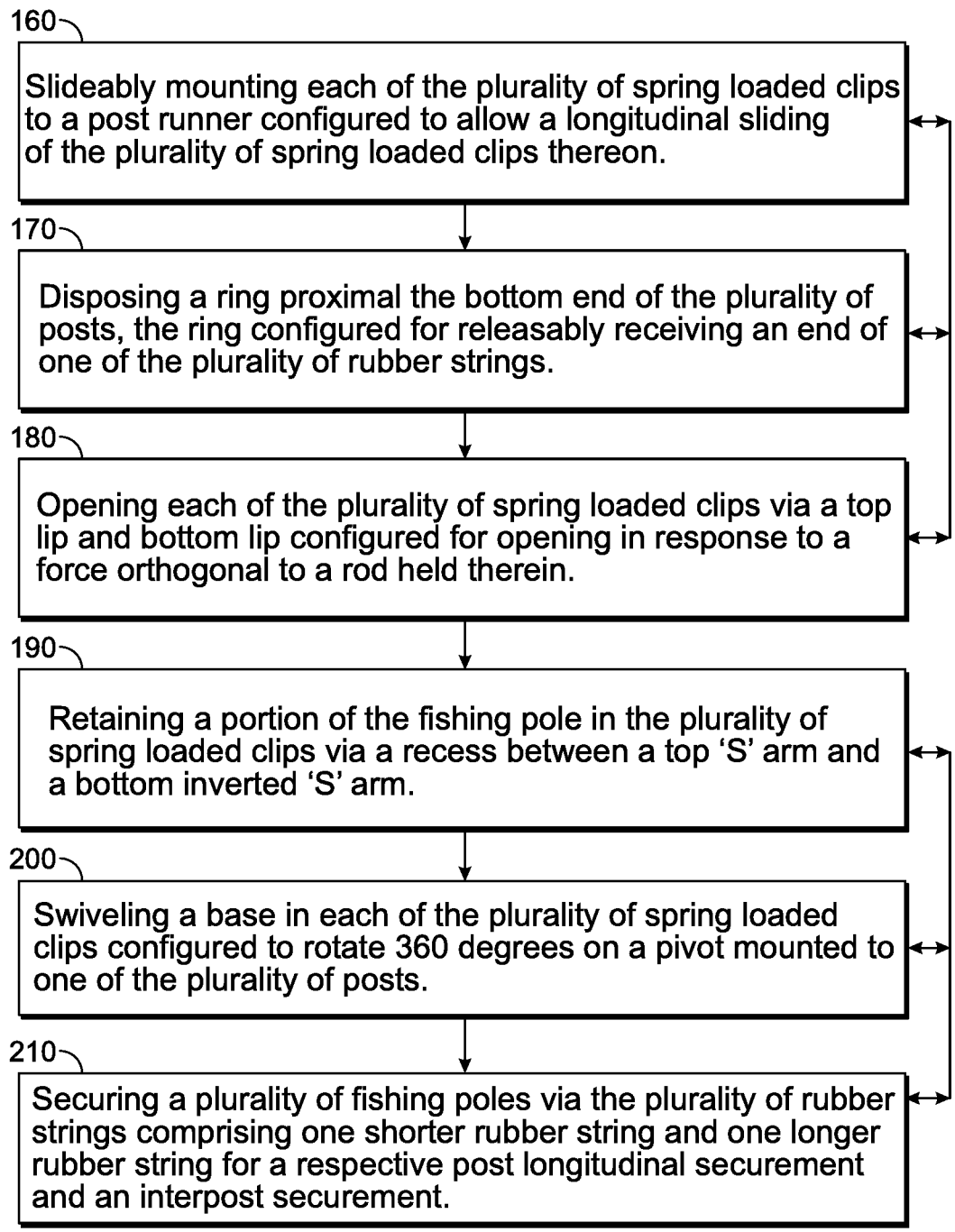
FIG. 3 is another flow chart of a method for mounting fishing rods in the bed of a truck in accordance with an embodiment of the disclosure.

FIG. 3 is a method for mounting fishing rods in the bed of a truck in accordance with an embodiment of the present disclosure. Embodiments of the method yet comprise slideably mounting 160 each of the plurality of spring loaded clips to a post runner configured to allow a longitudinal sliding of the plurality of spring loaded clips thereon. The embodiments include disposing 170 a ring proximal the bottom end of each of the plurality of posts, the ring configured for releasably receiving an end of one of the plurality of rubber strings.

Embodied methods of the disclosure include opening 180 each of the plurality of spring loaded clips via a top lip and a bottom lip configured for opening in response to a force orthogonal to a rod held therein. Embodied methods of the disclosure also include retaining 190 a portion of the fishing pole in the plurality of spring loaded clips via a recess between a top 'S' arm and a bottom inverted 'S' arm. Embodied methods of the disclosure additionally include swiveling 200 a base in each of the plurality of spring loaded clips configured to rotate 360 degrees on a pivot mounted to one of the plurality of posts.

Embodied methods of the disclosure further include securing 210 a plurality of fishing poles via the plurality of rubber strings comprising one shorter rubber string and one longer rubber string for a respective post longitudinal securement and an interpost securement.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A fishing rod rack comprising:
    a plurality of posts configured to be received into a truck bed post opening, each of the plurality of posts comprising a top end and a bottom end;
    a plurality of spring loaded clips each configured to retain a portion of a fishing rod on each of the plurality of posts; and
    a plurality of rubber strings each attached at the top end of each plurality of posts and releasably attached at the bottom end of each plurality of posts.

2. The fishing rod rack of claim 1, wherein each of the plurality of spring loaded clips comprise a spring loaded 'S' shaped bottom arm opposing a spring loaded and inverted 'S' shaped top arm.

3. The fishing rod rack of claim 1, wherein each of the plurality of spring loaded clips comprise a spring anchored against a clip base on a first end and a second end set in one of a top arm and a bottom arm.

4. The fishing rod rack of claim 1, wherein each of the plurality of spring loaded clips is mounted to a post runner and the post runner is mounted to one of the plurality of posts.

5. The fishing rod rack of claim 1, wherein each of the plurality of spring loaded clips is slideably mounted to a post runner configured to allow a longitudinal sliding of the plurality of spring loaded clips thereon.

6. The fishing rod rack of claim 1, further comprising a ring proximal the bottom end of each of the plurality of posts, the ring configured to releasably receive an end of one of the plurality of rubber strings.

7. The fishing rod rack of claim 1, wherein each of the plurality of spring loaded clips comprises a top lip and a bottom lip configured to open in response to a force orthogonal to a rod held therein.

8. The fishing rod rack of claim 1, wherein the plurality of spring loaded clips comprise a recess between a top 'S' arm and a bottom opposing 'S' arm for retaining the portion of the fishing rod.

9. The fishing rod rack of claim 1, wherein each of the plurality of spring loaded clips comprise a swiveling base configured to rotate 360 degrees on a pivot mounted to one of the plurality of posts.

10. The fishing rod rack of claim 1, wherein the plurality of rubber strings comprise one shorter rubber string and one longer rubber string for a respective post longitudinal securement and an interpost securement.

11. A method for mounting fishing rods, the method comprising:
    receiving a plurality of posts each into a truck bed post opening, each of the plurality of posts comprising a top end and a bottom end;
    retaining a portion of a fishing rod via a plurality of spring loaded clips each mounted on each of the plurality of posts; and
    releasably attaching a plurality of rubber strings each at the top end of each of the plurality of posts and at the bottom end of each plurality of posts.

12. The method of claim 11, further comprising spring loading the plurality of spring loaded clips via an 'S' shaped bottom arm opposing a spring loaded and inverted 'S' shaped top arm.

13. The method of claim 11, further comprising spring loading each of the plurality of spring loaded clips via anchoring a spring against a clip base on a first end and setting a second end in one of a top arm and a bottom arm.

14. The method of claim 11, further comprising mounting each of the plurality of spring loaded clips to a post runner and mounting the post runner to one of the plurality of posts.

15. The method of claim 11, further comprising slideably mounting each of the plurality of spring loaded clips to a post runner configured to allow a longitudinal sliding of the plurality of spring loaded clips thereon.

16. The method of claim 11, further comprising disposing a ring proximal the bottom end of each of the plurality of posts, the ring configured for releasably receiving an end of one of the plurality of rubber strings.

17. The method of claim 11, further comprising opening each of the plurality of spring loaded clips via a top lip and a bottom lip configured for opening in response to a force orthogonal to a rod held therein.

18. The method of claim 11, further comprising retaining a portion of the fishing pole in the plurality of spring loaded clips via a recess between a top 'S' arm and a bottom inverted 'S' arm.

19. The method of claim 11, further comprising swiveling a base in each of the plurality of spring loaded clips configured to rotate 360 degrees on a pivot mounted to one of the plurality of posts.

20. The method of claim 11, further comprising securing a plurality of fishing poles via the plurality of rubber strings comprising one shorter rubber string and one longer rubber string for a respective post longitudinal securement and an interpost securement.

* * * * *